United States Patent [19]

Neale et al.

[11] 4,405,561

[45] Sep. 20, 1983

[54] DRAIN AND SAMPLING VALVE ASSEMBLY FOR A FLUIDIZED BED REACTOR

[75] Inventors: Thomas J. Neale; Frederick C. Alverson; John S. Karg, all of Harlingen, Tex.

[73] Assignee: Foster Wheeler Energy Corporation, Livingston, N.J.

[21] Appl. No.: 316,375

[22] Filed: Oct. 29, 1981

[51] Int. Cl.³ .............................. B01J 8/26; B01J 8/18; F27B 15/08
[52] U.S. Cl. .................................. 422/145; 34/57 A; 201/17; 201/31; 422/142; 422/144; 422/219; 422/232; 431/170; 432/58
[58] Field of Search ............... 422/145, 219, 232, 233, 422/142, 144; 431/7, 170; 432/15, 58; 34/57 A; 201/17, 31

[56] References Cited

U.S. PATENT DOCUMENTS

| | | | |
|---|---|---|---|
| 2,649,358 | 8/1953 | Palmer | 34/57 A X |
| 2,809,102 | 10/1957 | Hall | 422/219 X |
| 2,850,364 | 9/1958 | Dowling | 422/145 X |
| 3,028,226 | 4/1962 | Wendell | 422/232 |
| 3,897,220 | 7/1975 | Alcock et al. | 422/219 X |
| 4,135,885 | 1/1979 | Wormser et al. | 422/145 X |
| 4,207,292 | 6/1980 | Bischoff et al. | 422/232 |
| 4,321,233 | 3/1982 | Tsuji et al. | 422/145 X |
| 4,330,502 | 5/1982 | Engstrom | 422/142 |
| 4,333,909 | 6/1982 | Stewart et al. | 422/145 X |
| 4,338,283 | 7/1982 | Sakamoto et al. | 422/145 X |

*Primary Examiner*—Barry S. Richman
*Attorney, Agent, or Firm*—Marvin A. Naigur; John E. Wilson; Warren B. Kice

[57] ABSTRACT

A drain and sampling valve assembly for a fluidized bed reactor in which a pipe extends from the fluidized bed supporting structure to a location externally of said reactor. A valve seat is supported by said supporting structure and a valve stem is disposed in the pipe and extends for the length of the pipe and has a valve head mounted at one end of the stem for cooperating with the valve seat. A mechanical actuator assembly is provided externally of said reactor for selectively moving the stem relative to the pipe and the movement of the valve head relative to the valve seat to control the flow of material from the fluidized bed into the pipe. A discharge pipe and a sampling valve cooperate with the other end of the first mentioned pipe for selectively controlling the discharge of material from said latter pipe for permitting samples to be taken.

5 Claims, 5 Drawing Figures

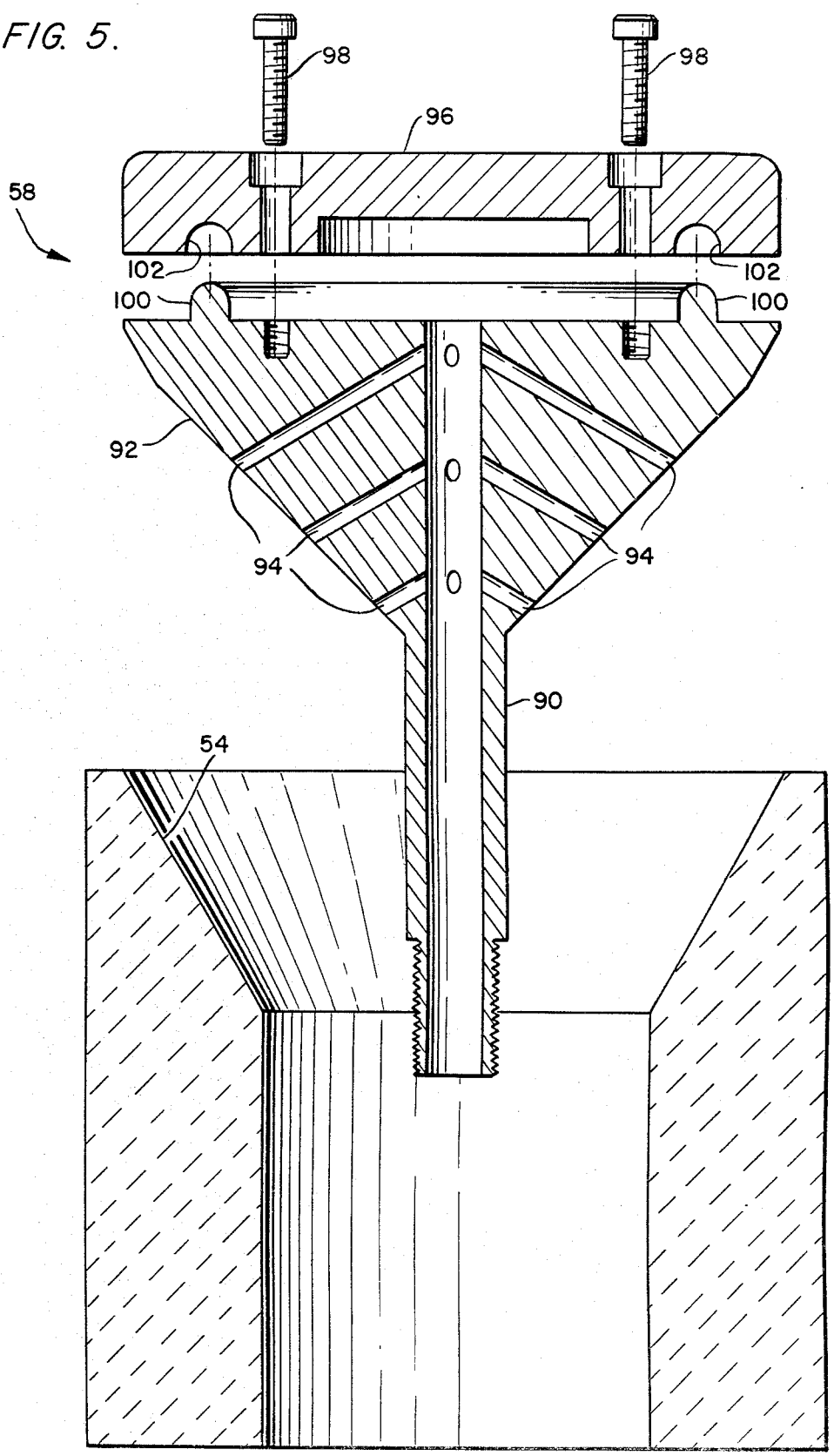

DRAIN AND SAMPLING VALVE ASSEMBLY FOR A FLUIDIZED BED REACTOR

BACKGROUND OF THE INVENTION

This invention relates to a drain and sampling valve assembly for controlling the flow of particulate material from a fluidized bed gasifier to an external source and for enabling the content of the material to be continuously sampled.

The Environmental Protection Agency and various state agencies have established standards of performance that define maximum allowable sulfur dioxide emission levels for fossil fueled power stations. In response to these standards, a generation of stack gas clean up equipment has been designed to remove, or scrub, sulfur dioxide from the steam generator flue gases prior to release into the atmosphere. Since large volumes of gas with dilute sulfur dioxide concentrations are encountered at the stream generator exit, the stack gas clean up equipment becomes large and expensive.

Instead of controlling sulfur dioxide emissions by treating the stack gases, it is advantageous to remove sulfur from the fuel prior to combustion in the steam generator, since at this stage the volume of gases requiring treatment is significantly reduced. To this end, a gasification process has evolved that involves the partial combustion of fuel, such as heavy fuel oil or particulate coal, in a fluidized bed of adsorbent material, such as lime particles. Desulfurization is accomplished through reaction with the lime particles and a combustible off-gas is produced that can be ducted to a steam generator where combustion is completed in commercially available gas burners.

It can be appreciated with the continuous cycling of the adsorbent material (and fuel when particulate fuel is used in the fluidized bed,) it is extremely important to know the precise conditions of the material in the bed at all times so that the operating conditions of the bed can be adjusted accordingly. For example, it is essential that the calcium content of the limestone in the bed be available to the operator at all times since a precise quantity of the calcium is essential to the efficient operation of the bed.

SUMMARY OF THE INVENTION

It is therefore an object of the present invention to provide a drain and sampling valve assembly for use in a gasifier in which sulfur is removed from the fuel.

It is a further object of the present invention to provide an assembly of the above type for use in a chemically active fluidized bed gasifier which produces a product gas substantially free of sulfur.

It is a further object of the present invention to provide an assembly of the above type which enables the content of the fluidized bed to be continuously monitored for the purposes of controlling the content of the bed material.

It is a further object of the present invention to provide an assembly of the above type which includes a valve head and seat arrangement located at the support grate for the fluidized bed which can be controlled from a external location to obtain desired samples of the bed material.

Toward the fulfillment of these and other objects, the drain and sampling valve assembly of the present invention comprises a pipe extending from the support grate for the fluidized bed to a location external of the reactor. A valve seat is supported by the support grate and a valve stem disposed in the pipe and extends for the length of the pipe. A valve head, mounted at one end of the stem, cooperates with the seat, and an actuator located eternally of the reactor, cooperates with the other end portion of the stem for selectively moving the stem relative to the pipe, and the valve head relative to the seat, to control the admission of material from the fluidized bed into the pipe. A discharge pipe cooperates with the other end of the first pipe for selectively controlling the discharge of material from the latter pipe and a sampling valve is provided for taking samples of the material.

BRIEF DESCRIPTION OF THE DRAWINGS

The above brief description, as well as further objects, features, and advantages of the present invention will be more fully appreciated by reference to the following detailed description of a presently preferred but nonetheless illustrative embodiment in accordance with the present invention, when taken in conjunction with the accompanying drawings wherein:

FIG. 5 is an enlarged sectional view depicting another portion of the drain and sampling valve assembly of FIG. 3.

DESCRIPTION OF THE PREFERRED EMBODIMENT

Figure 1:
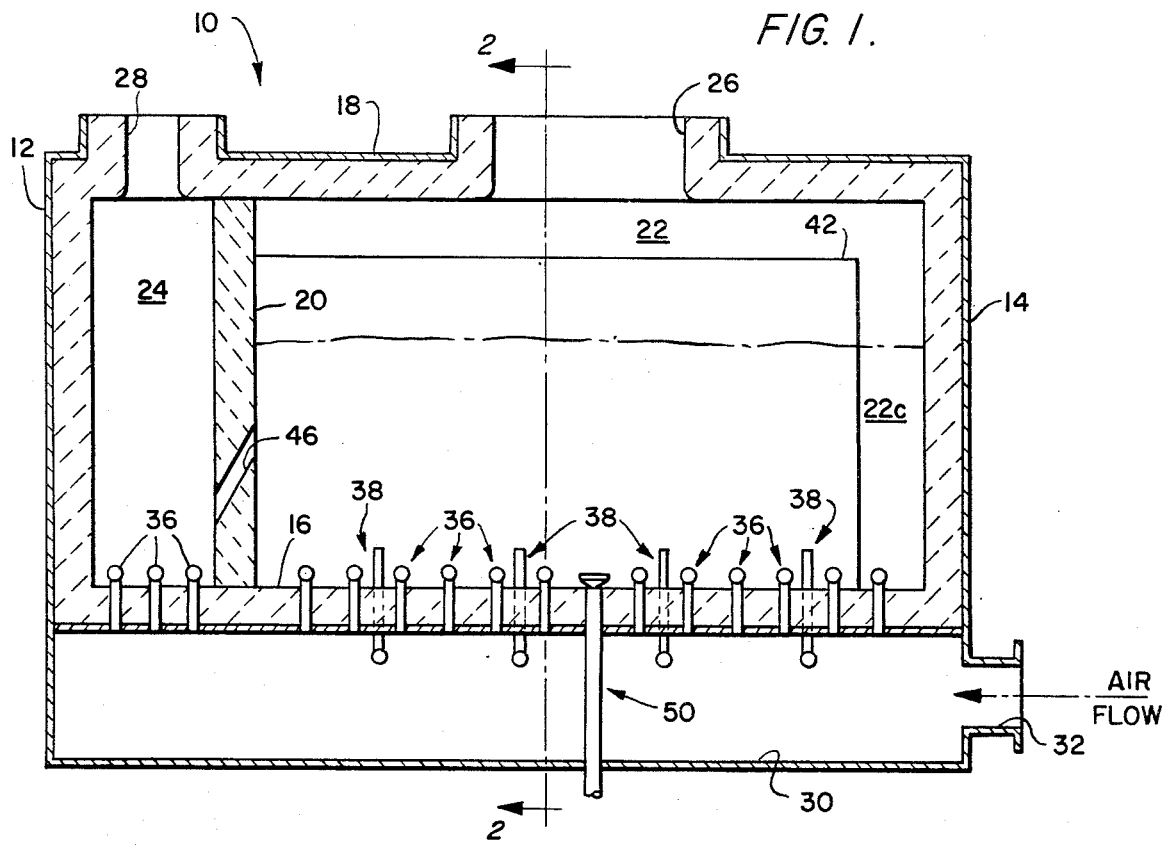
FIG. 1 is a vertical sectional view of a fluidized bed gasifier including the drain and sampling valve assembly of the present invention.

The drain and sampling valve assembly of the present invention will be shown in connection with a chemically active fluidized bed gasifier shown in general in FIG. 1 by the reference numeral 10. The gasifier includes an insulated front wall 12, a rear wall 14 and two sidewalls 15 (FIG. 2) extending between a floor 16 and a roof 18. A partition 20 also extends between the floor 16 and the roof 18 and parallel with the front and rear walls 12 and 14 to divide the gasifier 10 into a gasifying section 22 and a regenerating section 24. A pair of discharge outlets 26 and 28 are provided in the roof 18 to permit discharge of gases from the gasifying section 22 and the regenerating section 24, respectively.

An air duct 30 extends below the floor 16 and receives air, which is preferably preheated, from an external source through an inlet connection 32.

The floor 16 is perforated in order to receive a plurality of T-shaped air distributor pipe assemblies 36 which receive air from the duct 30 and introduce the air into the gasifying section 22 and the regenerating section 24. As better shown in FIG. 2, each pipe assembly 36 includes a vertical pipe 36a which extends through an opening in the floor 16 and a horizontal pipe 36b connected in registry with the vertical pipe and extending just above the floor.

A plurality of fuel distributor pipe assemblies 38 extend through other openings in the floor 16 below the gasifying section 22 with each assembly including a horizontal pipe 38a (FIG. 2) extending below the floor, and a vertical pipe 38b extending through an opening in the floor and connected in registry with the vertical pipe. An end portion of each horizontal pipe 38a extends through a sidewall 15 and is adapted to be connected to a source of fuel (not shown) which preferably is oil. A feeder 40 extends through a sidewall 15 and is adapted to feed an adsorbent, such as limestone particles, into the gasifying section 22.

Figure 2:
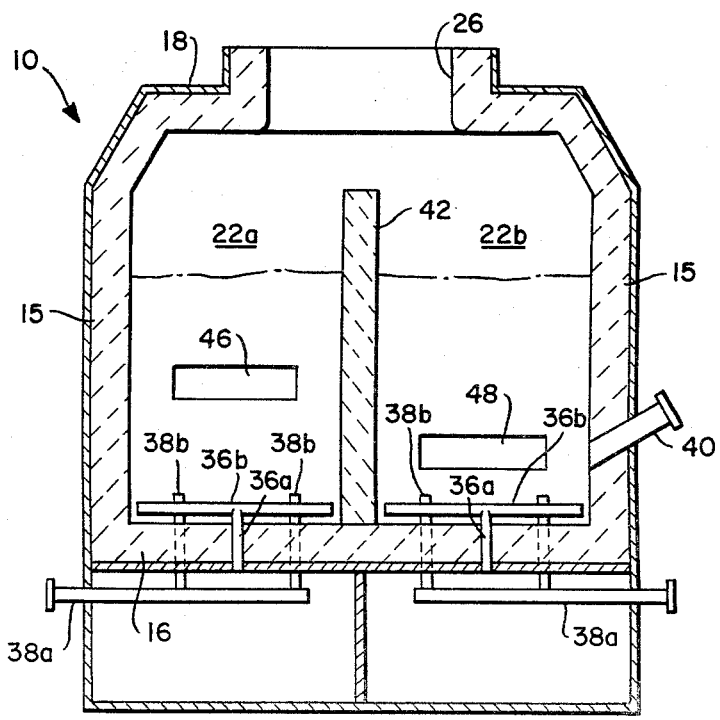
FIG. 2 is a cross-sectional view taken along the line 2—2 of FIG. 1.

A divider wall 42 is disposed in the gasifying section 22 and divides the section into chambers 22a and 22b (FIG. 2). The divider wall 42 extends from the partition 20 to an area spaced from the rear wall 14 to define a passage 22c (FIG. 1) communicating the chambers 22a and 22b.

An inlet slot 46 and an outlet slot 48 are formed through the partition 20 with the former communicating with the chamber 24a with the regenerating section 24 and the latter communicating the chamber 22b with the regenerating section.

As a result of this arrangement, and with the introduction of air from the duct 30 into the gasifying section 22 via the pipe assemblies 36, a mixture of limestone particles and fuel oil continually flows from the chamber 22b, around the passage 22c, through the chamber 22a and the slot 46 and into the regenerating section 24, and from the latter section, through the slot 48 and into the chamber 26b for recirculation.

The air from the duct 30 is admitted to the gasifying section 22 in substoichiometric proportions to limit the amount of combustion and heat release and flue gas is used as an inert, heat absorbing medium to control the overall process permperature. Partial combustion of the oil furnishes sufficient heat to vaporize and crack the remaining oil. This partial combustion results in the formation of hydrogen sulfide ($H_2S$) which reacts with the fluidized bed of lime to form calcium sulfide ($CaS$) and water. The gaseous product of this process is an essentially sulfur-free and vanadium-free fuel gas which discharges through the outlet 26.

The capacity for sulfur retention is maintained by the continuous removal of the sulfated lime and the replenishment of this material with sulfur-free lime in a manner to be described. Maintenance of the proper lime-sulfur ratio for optimum sulfur removal is accomplished by regenerating the calcium sulfide to lime in the regenerating section 24 by reacting the calcium sulfide particles with air from the duct 30 and driving off the $SO_2$. Upon completion of the sulfur burn off in the section 24, the lime is regenerated and is circulated back into the gasifying section 22 for re-use as a sulfur absorbent. The $SO_2$-rich off-gas from the regenerating section 24 discharges from the outlet 28 and is then passed to conventional sulfur recovery equipment where it can be treated for the removal of the $SO_2$ in the form of elemental sulfur.

Figure 3:
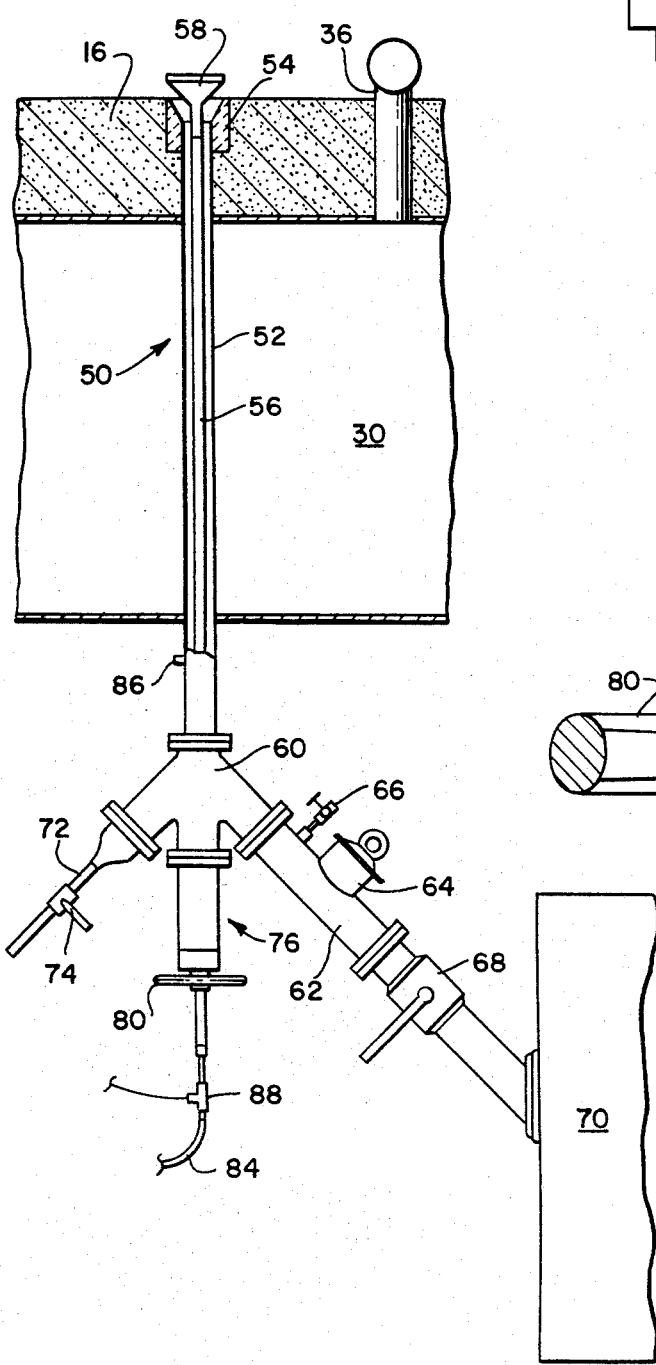
FIG. 3 is an enlarged partial sectional view of the gasifier of FIGS. 1 and 2 and depicting the drain and sampling valve assembly of the present invention.
Figure 4:
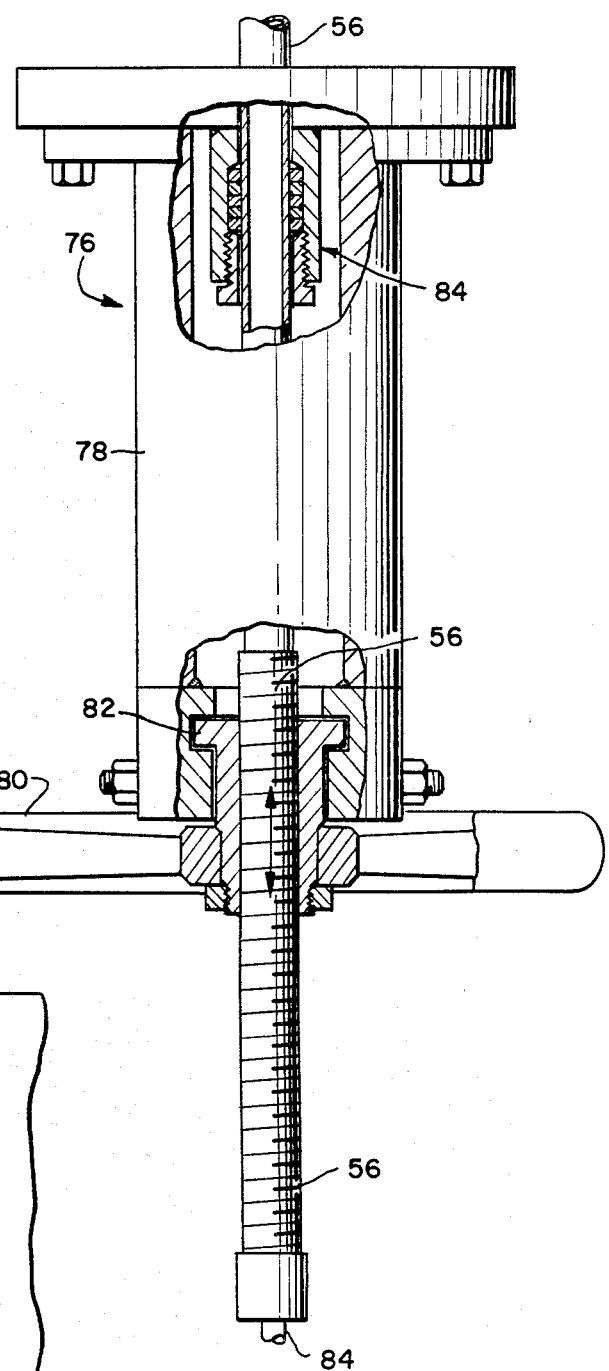
FIG. 4 is an enlarged sectional view depicting a portion of the drain and sampling valve assembly of FIG. 3.

The drain and sampling valve assembly of the present invention is shown in general by the reference numeral 50 in FIG. 1 and in greater detail in FIGS. 3-5. More particularly, and referring to FIG. 3, the assembly 50 includes a vertically extending pipe 52 which extends through the air duct 30 and the floor 16 of the gasifier 10, where it terminates slightly below the upper surface of the latter floor. A tapered valve seat 54 is located at the upper end of the pipe 52 and extends flush with the upper surface of the floor 16. A hollow stem 56 extends within the pipe 52 and has a valve head 58 connected to its upper end. The valve head 58 is tapered in a complementary relationship to the valve seat 54 and cooperates with the latter seat to control the flow of bed material into the pipe, as will be explained in detail.

The lower end of the pipe 52 connects to a three-way housing 60 which, by the flanged connections shown, connects to several components. More particularly, a discharge pipe 62 is connected to the housing 60 for receiving the bulk of the material discharged through the seat 54 and the pipe 52. A pneumatic vibrator 64 is supported on the pipe 62 to assist in the flow of material therethrough and a pressure release valve 66 is provided in the pipe 62. A drain valve 68 is connected to the pipe 62 for controlling the discharge of the material from the latter pipe into a solids cooler 70.

A sampling pipe 72, of a reduced cross-section when compared to the discharge pipe 62, is also connected to the housing 60 and includes a valve 74 for selectively releasing a relatively small volume of the material entering the housing 60 from the pipe 50.

An actuator assembly, shown in general by the reference numeral 76, is connected to the housing 60 and is shown in greater detail in FIG. 4. More particularly, the actuator assembly 76 includes an outer casing 78 connected to the housing 60, and a handwheel actuator 80 which extends over the lower threaded portion of the stem 56. The actuator 80 is connectecd to an internally threaded yoke sleeve 82 in threaded engagement with the stem 56 so that, upon rotation of the actuator, the stem moves in a vertical direction to move the valve stem 56 and, therefore, the valve head relative to the seat 54. A packing assembly, shown in general by the reference numeral 84, is provided in the casing 76 to support the aforementioned slidable movement of the stem 56.

Referring again to FIG. 3, a purge line 84 extends from the lower end of the stem 56 to permit a purge gas, such as nitrogen, to be introduced into the interior of the stem. Also, a fitting 86 is provided on that portion of the pipe 52 extending outwardly from the duct 30 to permit a purge gas to be introduced to the space between the inner wall of the pipe 52 and the stem 56. A thermocouple 88 is connected to the line 84 for permitting temperature measurements, in a conventional manner.

The details of the valve head 58 are better shown in FIG. 5. The head includes a cylindrical portion 90, the lower end portion of which is threaded to engage the stem 56, and a tapered head portion 92 having a central bore communicating with the interior of the stem and a plurality of angularly extending passages 94 extending from the latter bore to the outer surface of the head portion. This arrangement permits the aforementioned purge gas to pass through the head portion and towards the valve seat 54. A stainless steel cover 96 is provided over the upper portion of the head portion 92 and is connected thereto by a plurality of bolts 98. A pair of nipples 100 extend from the upper surface of the head portion 92 and extend in corresponding slots 102 for securing the connection between the cover 96 and the head portion 92. The cover 96 can be made of a material, such as stainless steel, particularly adapted to withstand heat while the head portion 92 can be of a less expensive material.

In operation, the temperature of the fluidized bed in the gasifying section 22 is maintained at a predetermined elevated value (such as 1600° F.) by control of the fuel entering the bed via the pipe assemblies 38, and air from the duct 30 is admitted into the latter section through the pipe assemblies 36 in substoichiometric proportions to limit the amount of combustion and heat release. The flue gas produced as a result of the fuel combustion is used as an inert, heat absorbing medium to control the overall process temperature.

Partial combustion of the fuel entering the gasifying section 22 with approximately 25 to 30% stoichiometric air furnishes sufficient heat to partially combust the oil and to vaporize and crack the remaining oil. This partial combustion results in the formation of hydrogen sulfide which reacts with the fluidized bed of lime particles to form calcium sulfide and water. The gaseous product of this process is an essentially sulfur-free and vanadium-free fuel gas which rises in the gasifying section 22 by natural convection and exits through the outlet 26 where it is passed to external equipment, such as burners of the furnace section of a vapor generator. The capacity for sulfur retention by the lime particles in the gasifying section 22 is maintained by the continuous removal of the sulfated lime through the drain and sampling valve assembly 50 and the replenishing of this material with sulfur-free lime through the feeder 40.

Air from the duct 30 is also admitted into the regenerating section 24 through the pipe assemblies 36 associated with the latter sections, and the calcium sulfide formed in the gasifying section 22 is passed through the slot 46 and/or slot 48 into the regenerating section 24 and is circulated through the latter section, as discussed above, to convert the calcium sulfide to calcium oxide while producing an off-gas with a high sulfur dioxide concentration. As the calcium sulfide is transferred into the oxygen-rich regenerating section 24 (preferably at about 1900° F.) the following reaction takes place:

$$CaSO_4 + CaS + O_2 \rightarrow 2CaO + 2SO_2$$

The sulfur dioxide formed by the above reaction leaves the regenerating section 24 through the outlet 28 and is recovered from the gas stream by external equipment in the form of elemental sulfur, while calcium oxide is recirculated, via the slot 46 and/or slot 48 back to the gasifying section 22 for re-use as a sulfur absorbent.

It is understood that several variations can be made in the foregoing without departing from the scope of the invention. For example, the present invention is not limited to a gasifier, as described above, but can be any form of fluidized bed reactor. Also, the present invention is not limited to the use of a reactor in which oil is used as fuel but also is equally applicable to fluidized bed reactors using particulate coal. Also, the number and location of the drain and sampling valve assemblies of the present invention is not limited to those disclosed in the foregoing exemplary embodiment, but can be changed as needed.

A latitude of modification, change and substitution is intended in the foregoing disclosure and in some instances some features of the invention will be employed without a corresponding use of other features. Accordingly, it is appropriate that the appended claimes be construed broadly and in a manner consistent with the spirit and scope of the invention therein.

What is claimed is:

1. In a fluidized bed reactor having a material fluidizing means and a bed material discharging means; the improvement wherein said bed material discharging means comprises a pipe extending from a location external of said reactor, to said bed, a valve seat communicating with said bed, a hollow valve stem disposed in said pipe and extending for the length of said pipe, a valve head mounted at one end of said stem and adapted to cooperate with said seat, a plurality of passages registering with the interior of said stem and directed towards said valve seat, means located externally of said reactor and cooperating with the other end portion of said stem for selectively moving said stem relative to said pipe, and said valve head relative to said seat, to control the flow of material from said fluidized bed into said pipe, means for introducing a pressurized gas into said pipe for passage through the passage formed between said stem and the inner wall of said pipe and into said bed to prevent clogging of materials in said pipe, and means for introducing a pressurized gas into said stem for passage through said stem and through said passages in said valve head to purge said seat.

2. The reactor of claim 1 wherein the improvement further comprises said valve seat being supported by the floor of said reactor.

3. The reactor of claim 1 wherein the improvement further comprises means cooperating with the other end of said pipe for selectively controlling the discharge of material from said pipe.

4. The reactor of claim 3 wherein the improvement further comprises a discharge pipe registering with said first pipe and valve means for controlling the discharge of said material from said discharge pipe.

5. The reactor of claim 4 wherein the improvement further comprises providing discharge of said material from said fluidized bed through said first pipe and said discharge pipe by gravity.

* * * * *